United States Patent
Berry

(10) Patent No.: US 9,173,526 B2
(45) Date of Patent: Nov. 3, 2015

(54) POTATO CHIP LIFTER

(71) Applicant: Donald P. Berry, Debary, FL (US)

(72) Inventor: Donald P. Berry, Debary, FL (US)

( * ) Notice: Subject to any disclaimer, the term of this patent is extended or adjusted under 35 U.S.C. 154(b) by 0 days.

(21) Appl. No.: 14/206,921

(22) Filed: Mar. 12, 2014

(65) Prior Publication Data

US 2015/0257605 A1    Sep. 17, 2015

(51) Int. Cl.
*A47J 43/28* (2006.01)

(52) U.S. Cl.
CPC ........................................ *A47J 43/28* (2013.01)

(58) Field of Classification Search
CPC .............................. B65D 83/005; A47J 43/28
USPC .............. 294/173, 12, 26, 175, 26.5, 32, 219; 206/804; 215/391; 221/279
See application file for complete search history.

(56) References Cited

U.S. PATENT DOCUMENTS

| | | | |
|---|---|---|---|
| 2,876,930 A * | 3/1959 | Theodore | 221/260 |
| 2,904,205 A * | 9/1959 | Callery | 215/391 |
| 3,249,250 A * | 5/1966 | McKee | 215/391 |
| 3,498,798 A | 3/1970 | Baur et al. | |
| 5,082,135 A * | 1/1992 | DeCoster | 220/694 |
| 6,036,038 A | 3/2000 | Lovelace et al. | |
| 6,578,344 B1 | 6/2003 | Fluck | |
| 6,745,918 B2 | 6/2004 | Greene | |
| 7,487,878 B2 | 2/2009 | Giwargis et al. | |
| 7,556,167 B2 | 7/2009 | Giwargis et al. | |
| 2008/0110881 A1* | 5/2008 | Schulz et al. | 220/8 |
| 2009/0050584 A1* | 2/2009 | Muhlbaier | 211/59.3 |
| 2009/0188936 A1 | 7/2009 | Marando | |
| 2011/0127261 A1 | 6/2011 | Levie | |
| 2012/0000884 A1* | 1/2012 | Adi | 215/391 |

FOREIGN PATENT DOCUMENTS

FR      2 752 374    *    2/1998

* cited by examiner

*Primary Examiner* — Dean Kramer
(74) *Attorney, Agent, or Firm* — Michael L. Leetzow, P.A.

(57) ABSTRACT

A potato chip lifting apparatus has a elongated handle with a front side and a back side, the back side having a plurality of catching mechanisms extending from the back side of the elongated handle and away from the elongated handle, the catching mechanisms configured to engage a can in which potato chips are stored. The foot portion extends from a bottom portion of the elongated handle in a direction of the front side of the handle and generally orthogonal to the elongated handle and the front side thereof. Finally, the potato chip apparatus has a support extending upward from a top surface of the foot portion upward and parallel to the elongated handle to support potato chips resting on the potato chip lifting apparatus.

13 Claims, 8 Drawing Sheets

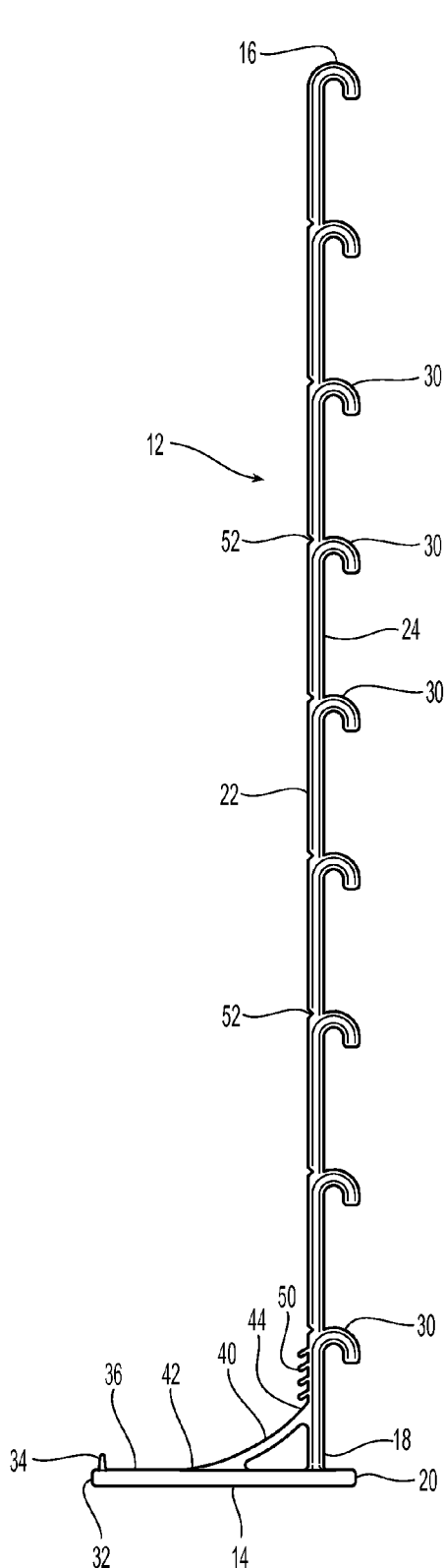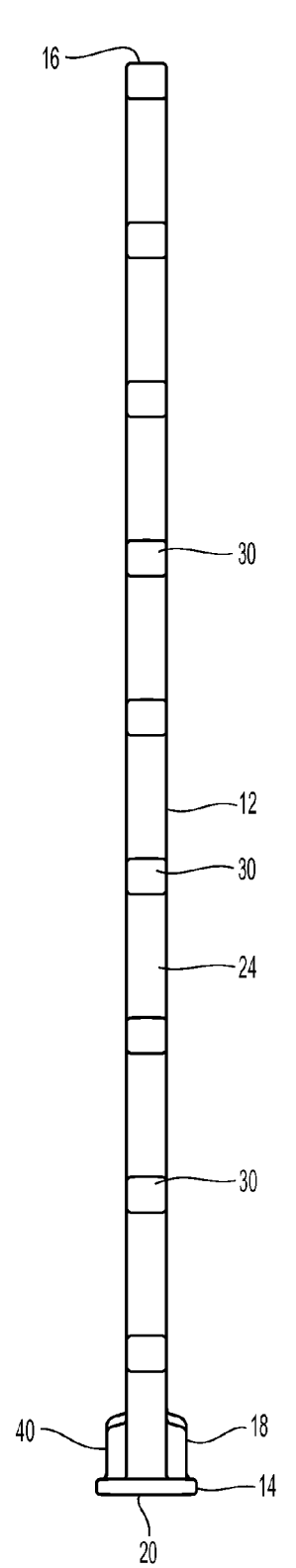
*Fig. 2*     *Fig. 3*

POTATO CHIP LIFTER

BACKGROUND OF THE INVENTION

Field of the Invention

The present invention is directed to an apparatus that may be inserted into a potato chip can before or after the potato chips are loaded into the potato chip can.

There are many ways to package and ship potato chips. The potato chips are packaged in bags, foil bags, recyclable bags, and cans. The potato chips in the bags are easy to retrieve by a potato chip eater. To get to the bottom of the container, the eater only needs to open the bag all the way. However, when the preformed chips that are shipped in the elongated cylindrical cans, it can be difficult to retrieve the chips once the first couple of inches of chips have been eaten. The eater can turn the can over or onto its side to get the remaining chips. However, the eater runs the risk of dumping pieces of broken chips all over one's self or into the surroundings. There are lifting mechanisms that are placed into the can before the chips are inserted and the can sealed. While these may be useful, it does not help with the cans that have no mechanism and they can't be added by the consumer later. Additionally, the preinstalled lifting mechanisms add weight to the can, thereby increasing the shipping costs. The preinstalled lifting mechanisms also make it more difficult to load the chips and can increase the number of broken potato chips. Therefore, a potato chip lifter than can be inserted into the potato chip can after it is purchased is needed.

SUMMARY OF THE INVENTION

According to one aspect of the present invention, a potato chip lifting apparatus is disclose, the potato chip lifting apparatus includes a elongated handle, the elongated handle having a front side and a back side, the back side having a plurality of catching mechanisms extending from the back side of the elongated handle and away from the elongated handle, the catching mechanisms configured to engage a can in which potato chips are stored, a foot portion extending from a bottom portion of the elongated handle in a direction of the front side of the handle and generally orthogonal to the elongated handle and the front side thereof, and a support extending upward from a top surface of the foot portion upward and parallel to the elongated handle to support potato chips resting on the potato chip lifting apparatus.

In yet another aspect, the invention is directed to a method of using a potato chip lifting apparatus that includes the steps of providing a potato chip lifting apparatus having a elongated handle, the elongated handle having a front side and a back side, the back side having a plurality of catching mechanisms extending from the back side of the elongated handle and away from the elongated handle, the catching mechanisms configured to engage a can in which potato chips are stored, a foot portion extending from a bottom portion of the elongated handle in a direction of the front side of the handle and generally orthogonal to the elongated handle and the front side thereof, and a support extending upward from a top surface of the foot portion upward and parallel to the elongated handle to support potato chips resting on the potato chip lifting apparatus, providing a can with a stack of potato chips therein, orienting the can such that the stack of potato chips are not in a substantially vertical position, sliding the potato chip lifting apparatus between the can and the stack of potato chips, rotating the potato chip lifting apparatus such that the foot portion is under the stack of potato chips; and lifting the stack of the potato chips toward a top of the can.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description of the present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and, together with the description, serve to explain the principles and operations of the invention.

BRIEF DESCRIPTION OF THE DRAWINGS

FIG. 2 is a right side elevational view of the potato chip lifter of FIG. 1;

FIG. 3 is a rear side elevational view of the potato chip lifter of FIG. 1;

DETAILED DESCRIPTION OF THE PREFERRED EMBODIMENTS

Figure 1:
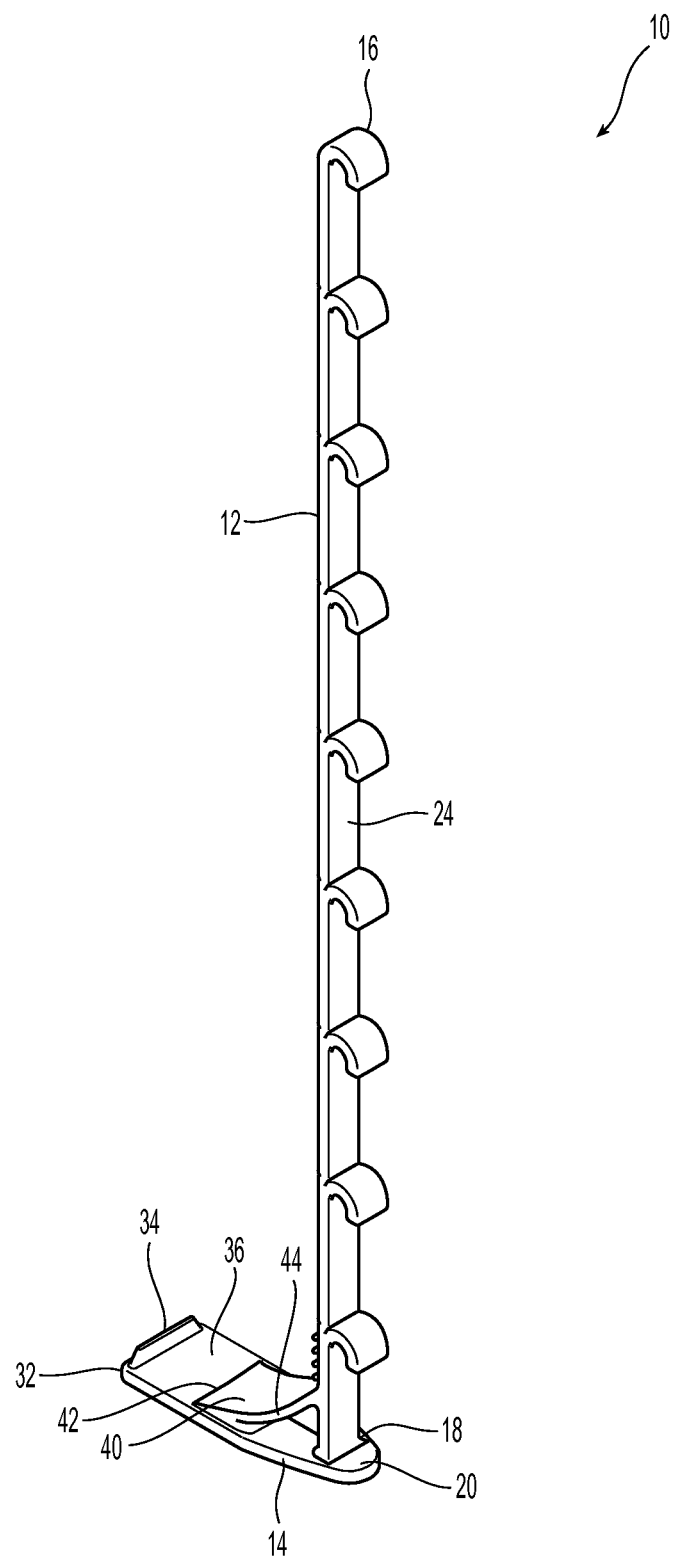
FIG. 1 is a rear perspective of one embodiment of a potato chip lifter according to the present invention.

Reference will now be made in detail to the present preferred embodiment(s) of the invention, examples of which are illustrated in the accompanying drawings. Whenever possible, the same reference numerals will be used throughout the drawings to refer to the same or like parts.

Referring to FIGS. 1-3, one embodiment of a potato chip lifter 10 has an elongated handle 12 and a foot portion 14. The potato chip lifter 10 is preferably a unitary element that is all formed as a single unit, but it could be made in pieces and connected together, by ultrasonic welding or another technique as is known in the art The elongated handle 12 has a top end 16 and a bottom end 18 that connects with the back end 20 of the foot portion 14. The elongated handle 12 also has a front side 22 and a back side 24. Extending from the back side 24 are catching mechanisms 30. The catching mechanisms 30 are preferably spread along the elongated handle 12 at equal spacing. The catching mechanisms 30 are preferably inverted U-shaped members that engage the edge of a can. See FIG. 8. While the catching mechanisms 30 are illustrated as inverted U-shaped members, they may have any relevant shape (e.g., inverted V-shape, see also FIGS. 9 and 10) and still fall within the scope of the present invention.

The foot portion 14 is attached to the elongated handle 12 at the bottom 18 thereof. The foot portion 14 is preferably and elongated flat member having a front end 32 and a back end 20. The foot portion 14 is preferably attached to the elongated handle 12 at about 90°, although other angles could be used and fall within the scope of the present invention. The front end 32 of the foot portion 14 is preferably wider than the back end 20, the foot portion 14 tapering in its width about one third of the way from the back end 22 to the front end 32. The front end 32 of the foot portion 14 may also be pointed to assist in moving under the potato chips. Adjacent the front end 32 is a support 34 extending upward from a top surface 36 of the foot portion 14. The support 34 extends upward in a parallel direction to the elongated handle 12 and orthogonal to the top surface 36 to support potato chips resting on the potato chip lifter 10. See FIG. 4. The support 34 assists in keeping the chips on the potato chip lifter 10.

The potato chip lifter 10 also has a stability element 40. The stability element 40 is connected to the foot portion 14 at the front side 42 of the stability element 40 and to the elongated handle 12 at the back side 44 of the stability element 40. The stability element 40 may also provide support and guidance to the stack of chips (see FIG. 7 after the potato chip lifter 10 has been inserted into the can of chips and is used to lift the stack of chips.

Figure 4:
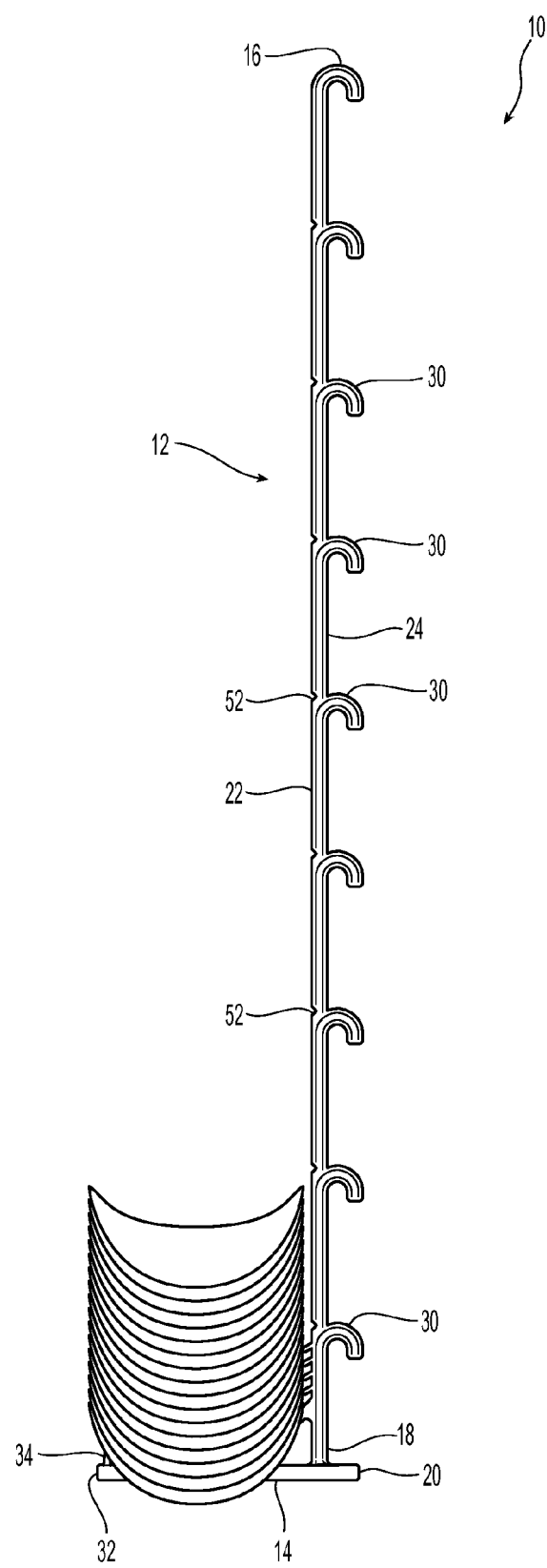
FIG. 4 is right side elevational view of the potato chip lifter of FIG. 1 with some potato chips.

The elongated handle 12 also has a plurality of guides 50 adjacent the back side 44 of the stability element 40. The plurality of guides 50 project from the front side 22 of the elongation handle 12, and preferably in a downward direction toward the foot portion 14. The guides 50 can engage the edges of the chips in the stack and prevent them from rotating, as illustrated in FIG. 4, in a counterclockwise direction and fall off the front end 32 thereof. While four of the guides 50 are illustrated in the figures, it is possible to have more or fewer of the guides 50 and still come within the scope of the present invention.

Beginning directly above the guides 50 are also a plurality of thinned areas or scored areas 52. These scored areas 52 provide breaking points for the user if so desired. As can be realized, as the chips are taken from the top of the stack, and the stack gets shorter, the user must lift the potato chip lifter 10 higher in the can. Thus, more of the potato chip lifter 10 will extend above the top edge of the can. See FIG. 8. Because the length of the potato chip lifter 10 may get in the way of the user, the user can break off sections of the elongated handle 12 at the scored areas 52.

Figure 5:
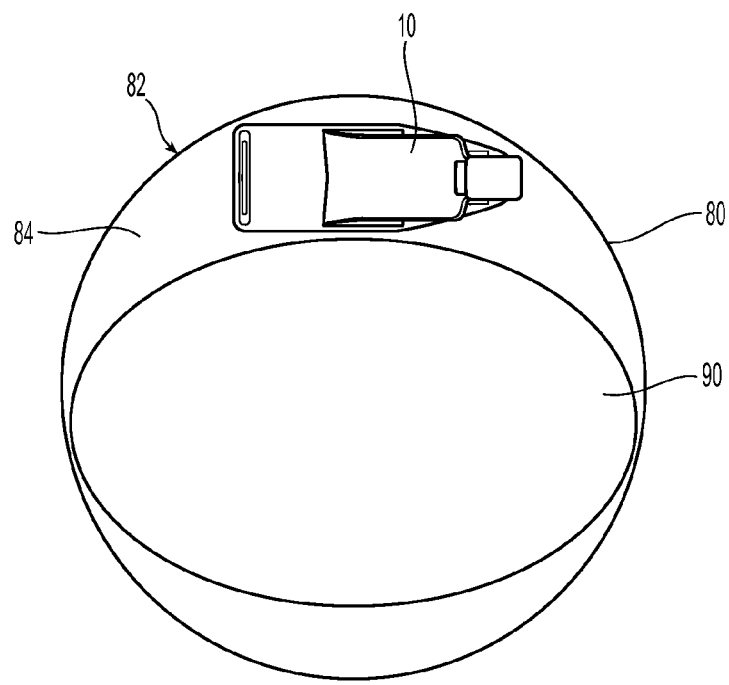
FIG. 5 is a top view of the potato chip lifter of FIG. 1 being inserted into a can of potato chips and passing between the can and the potato chips.
Figure 6:
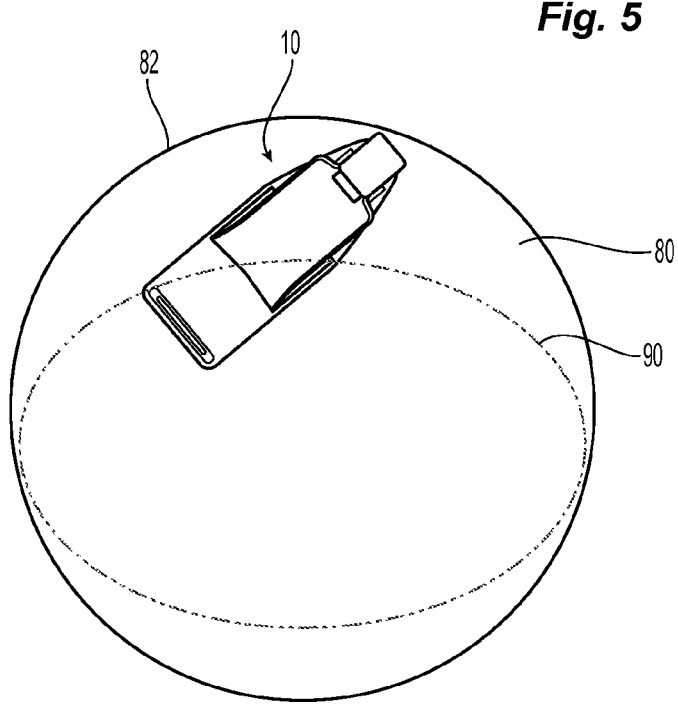
FIG. 6 is a top view of the potato chip lifter moving in the can from the inserted position to the lifting position.

Turning now to FIGS. 5 and 6, the potato chip lifter 10 is inserted into the can 80 between the stack of chips 90 and the wall 82 of the can 80. As illustrated in FIG. 5, the stack of chips 90 can be moved relative to the can 80. In this figure, the can 80 has been turned on its side so that the stack of chips 90 is lying on its side. The potato chip lifter 10 has been inserted into the space 84 created in the can 80. The potato chip lifter 10 is sized to fit within the space 84. Once the potato chip lifter 10 hits the bottom of the can 80, the potato chip lifter 10 is rotated to pass under the bottom chip in the stack of chips 90. The can 80 can be tilted or otherwise oriented to allow the potato chip lifter 10 to pass under the bottom chip in the stack 90. The resulting position is illustrated in FIG. 7.

Figure 8:
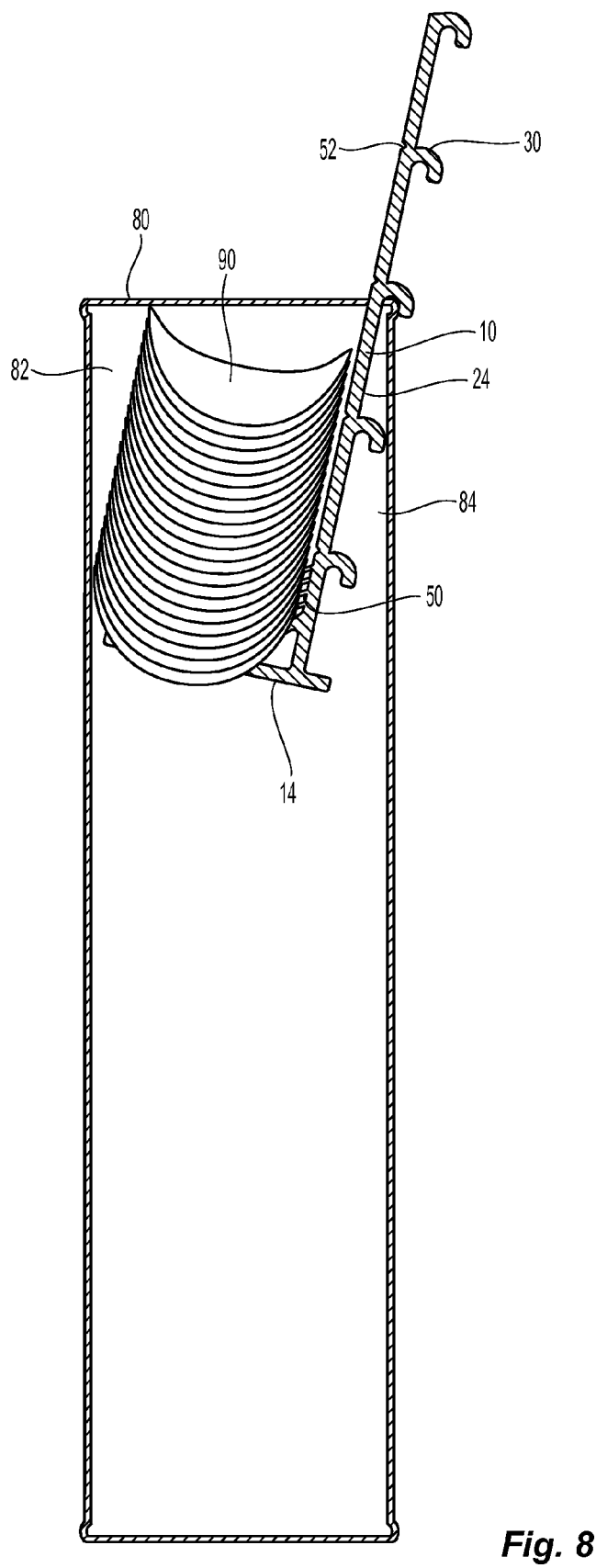
FIG. 8 is a cross section view of the potato chip lifter in the can lifting the chips, the catching mechanisms engaging the side of the can, and the chip lifter truncated.

As the person eating the chips eats more of the chips, the potato chip lifter 10 is used to move the stack of chips 90 upward so the person can access the chips without turning the can on its side or over, and having pieces of the chips fall onto them. As noted above, as the stack becomes smaller, the more of the elongated handle 12 extends out of the can 80, as illustrated in FIG. 8. The user can, use the catching mechanisms 30, engage the elongated handle 12 on the wall 82 of the can 80 and hold the stack of potato chips 90 toward the top of the can 80 so the chips can be easily retrieved. The catching mechanisms 30 can be fewer or more and have different spacings than that illustrated in the figures. Moreover, the catching mechanisms 30 can also be longer and extend at different angles, depending on the preference of the user and the space 84 in the can. See FIG. 9.

Figure 7:
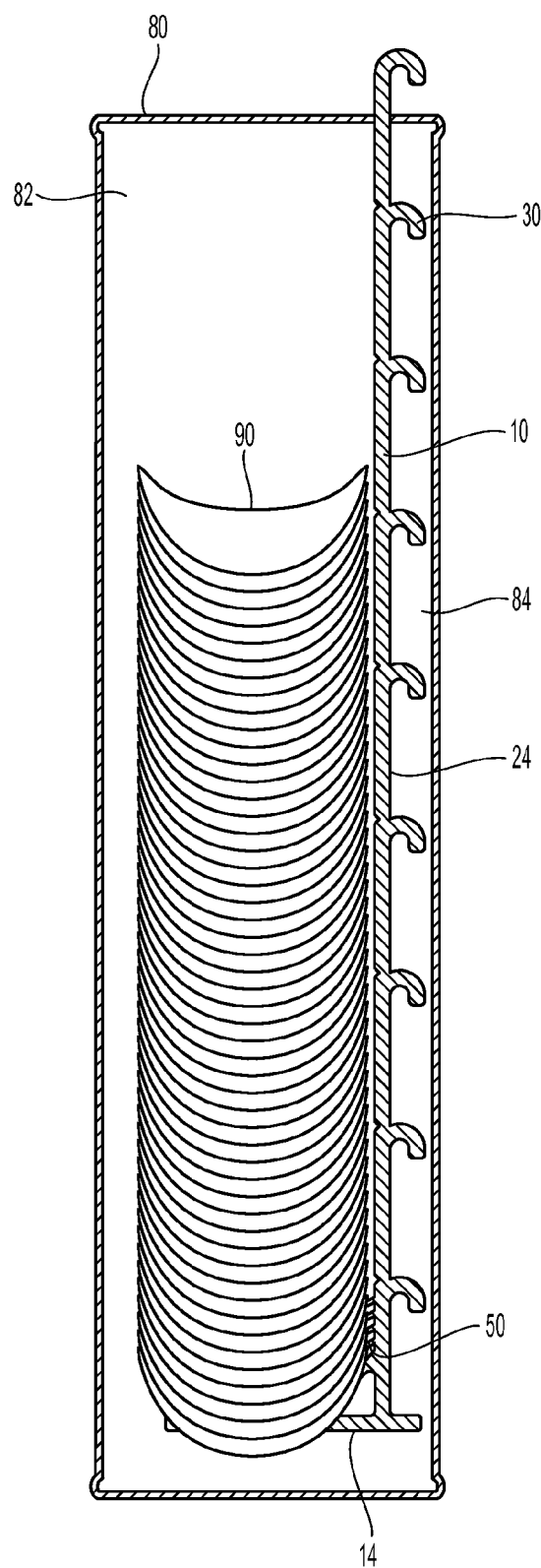
FIG. 7 is a cross section view of the potato chip lifter in the can ready to lift the chips.

It should be noted that while this invention can be used for those chips and cans after they have been packaged, a packing company could also include the potato chip lifter 10 in the space 84 between the stack 90 and the can 80, or in the usable configuration as illustrated in FIG. 7.

Figure 9:
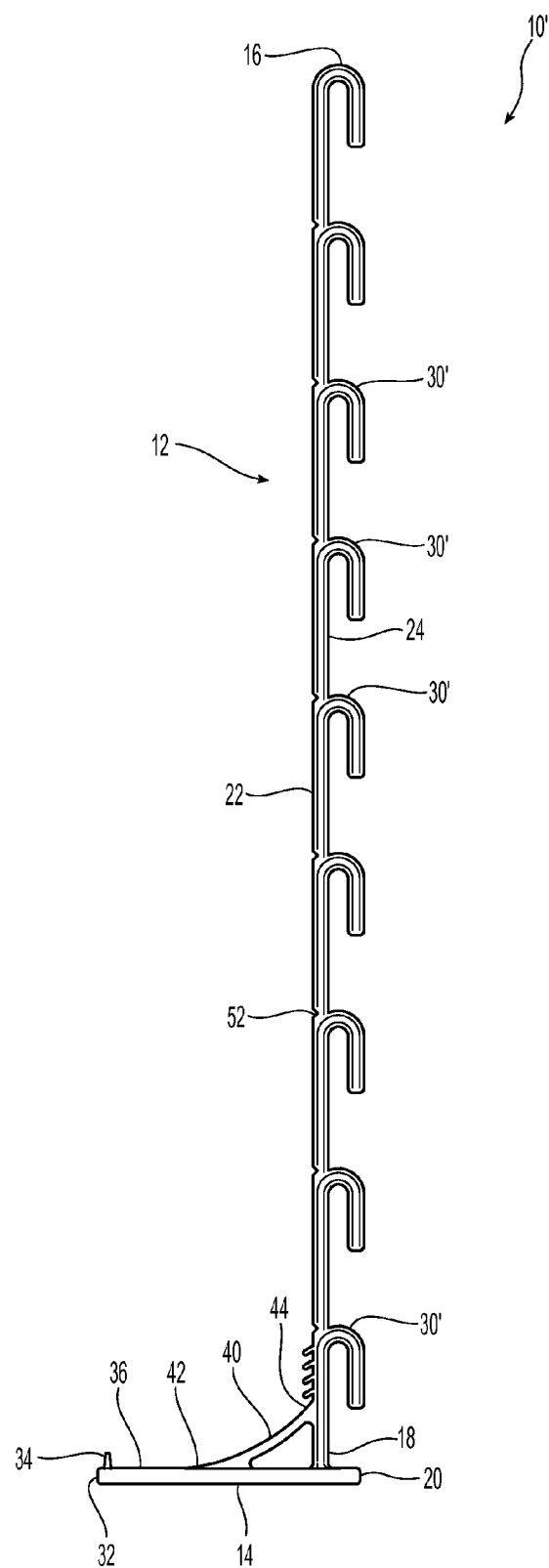
FIG. 9 is a side elevational view of a second embodiment of a potato chip lifter according the present invention.

An alternative embodiment of a potato chip lifter 10' as illustrated in FIG. 9 has an elongated handle 12 and a foot portion 14. The potato chip lifter 10' is similar to the first embodiment, but has catching mechanisms 30'. The catching mechanisms 30' are preferably spread along the elongated handle 12 at equal spacing. The catching mechanisms 30' are preferably inverted U-shaped members that are longer than the previous embodiment.

Figure 10:
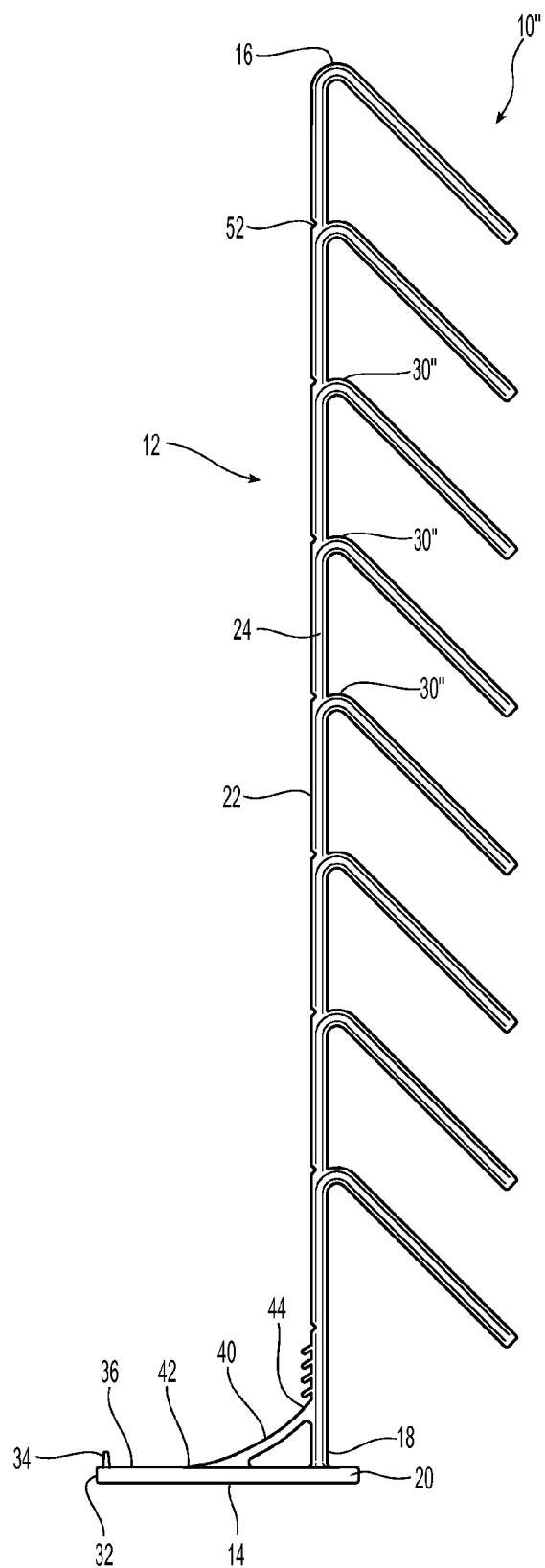
FIG. 10 a side elevational view of a third embodiment of a potato chip lifter according the present invention.

FIG. 10 has another embodiment of a potato chip lifter 10" has an elongated handle 12 and a foot portion 14. The potato chip lifter 10" is similar to the first two embodiments, but has catching mechanisms 30". The catching mechanisms 30" have an inverted configuration, but have a greater angle with the elongated handle 12 and are longer.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

I claim:

1. A potato chip lifting apparatus comprising:
   a single elongated handle, the single elongated handle having a front side and a back side, the back side having a plurality of catching mechanisms extending from the back side of the single elongated handle and away from the single elongated handle, the catching mechanisms configured to engage a can in which potato chips are stored;
   a foot portion extending from a bottom portion of the single elongated handle in a direction of the front side of the single elongated handle and generally orthogonal to the single elongated handle and the front side thereof;
   a support extending upward from a top surface of the foot portion upward and parallel to the elongated handle to support potato chips resting on the potato chip lifting apparatus; and
   a stability element, the stability element connected to the single elongated handle at the front side and the foot portion.

2. The potato chip lifting apparatus according to claim 1, wherein the stability element has a generally concave shape.

3. The potato chip lifting apparatus according to claim 1, wherein the single elongated handle and the foot portion are attached at a 90° angle.

4. The potato chip lifting apparatus according to claim 1, wherein the single elongated handle has a plurality of thinned areas along its length to provide breaking points.

5. The potato chip lifting apparatus according to claim 1, wherein the single elongated handle and the foot portion fit between a side wall of a can in which potato chips are stored and a stack of potato chips disposed in the can.

6. The potato chip lifting apparatus according to claim 1, wherein the foot portion can be rotated relative to a stack of potato chips in a can, the foot portion disposed transverse to the potato chips.

7. The potato chip lifting apparatus according to claim 1, wherein the single elongated handle has a plurality of spaced projections extending from the front side.

8. The potato chip lifting apparatus according to claim 1, wherein the foot portion has a back end adjacent the single elongated handle and an opposed front end, the foot portion is narrower at the back end than at the front end.

9. A method of using a potato chip lifting apparatus comprising the steps of:
 providing a potato chip lifting apparatus having an elongated handle, the elongated handle having a front side and a back side, the back side having a plurality of catching mechanisms extending from the back side of the elongated handle and away from the elongated handle, the catching mechanisms configured to engage a can in which potato chips are stored, a foot portion extending from a bottom portion of the elongated handle in a direction of the front side of the handle and generally orthogonal to the elongated handle and the front side thereof, and a support extending upward from a top surface of the foot portion upward and parallel to the elongated handle to support potato chips resting on the potato chip lifting apparatus;
 providing a can with a stack of potato chips therein;
 orienting the can such that the stack of potato chips are not in a substantially vertical position;
 sliding the potato chip lifting apparatus between the can and the stack of potato chips;
 rotating the potato chip lifting apparatus such that the foot portion is under the stack of potato chips;
 lifting the stack of the potato chips toward a top of the can.

10. A potato chip lifting apparatus comprising:
 a single elongated handle, the single elongated handle having a front side and a back side, the back side having a plurality of catching mechanisms extending from the back side of the single elongated handle and away from the single elongated handle, the catching mechanisms configured to engage a can in which potato chips are stored and wherein the single elongated handle has a plurality of spaced projections extending from the front side;
 a foot portion extending from a bottom portion of the single elongated handle in a direction of the front side of the single elongated handle and generally orthogonal to the single elongated handle and the front side thereof; and
 a stability element, the stability element connected to the single elongated handle at the front side and the foot portion.

11. The potato chip lifting apparatus according to claim 10, wherein the stability element has a generally concave shape.

12. The potato chip lifting apparatus according to claim 10, wherein the single elongated handle has a plurality of thinned areas along its length to provide breaking points.

13. The potato chip lifting apparatus according to claim 10, wherein the foot portion has a back end adjacent the single elongated handle and an opposed front end, the foot portion is narrower at the back end than at the front end.

* * * * *